US012602581B2

(12) United States Patent
Feng et al.

(10) Patent No.: US 12,602,581 B2
(45) Date of Patent: Apr. 14, 2026

(54) SYSTEMS AND METHODS FOR OUT-OF-DISTRIBUTION DETECTION

(71) Applicant: Salesforce, Inc., San Francisco, CA (US)

(72) Inventors: Yihao Feng, Austin, TX (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 1140 days.

(21) Appl. No.: 17/098,007

(22) Filed: Nov. 13, 2020

(65) Prior Publication Data

US 2021/0374524 A1     Dec. 2, 2021

Related U.S. Application Data

(60) Provisional application No. 63/032,696, filed on May 31, 2020.

(51) Int. Cl.
*G06N 3/08* (2023.01)
*G06N 3/063* (2023.01)

(52) U.S. Cl.
CPC ............... *G06N 3/08* (2013.01); *G06N 3/063* (2013.01)

(58) Field of Classification Search
CPC .... G06N 3/08; G06N 3/063; G06F 18/21375; G06F 18/214; G06F 18/2453; G06V 10/7753
See application file for complete search history.

(56) References Cited

U.S. PATENT DOCUMENTS

| | | | |
|---|---|---|---|
| 2014/0279777 A1* | 9/2014 | Cornebise | G06N 3/045 |
| | | | 706/22 |
| 2021/0150385 A1* | 5/2021 | Mallette | G06F 16/3329 |
| 2022/0155926 A1* | 5/2022 | Bhatt | G06F 3/167 |

OTHER PUBLICATIONS

Rajasegarar, Sutharshan, et al. "Centered hyperspherical and hyperellipsoidal one-class support vector machines for anomaly detection in sensor networks." IEEE Transactions on Information Forensics and Security 5.3 (2010): 518-533. (Year: 2010).*
Montufar, Guido F., et al. "On the No. of linear regions of deep neural networks." Advances in neural information processing systems 27 (2014). (Year: 2014).*

(Continued)

*Primary Examiner* — Sehwan Kim
(74) *Attorney, Agent, or Firm* — Haynes and Boone, LLP

(57) ABSTRACT

Some embodiments of the current disclosure disclose methods and systems for detecting out-of-distribution (ODD) data. For example, a method for detecting ODD data includes obtaining, at a neural network composed of a plurality of layers, a set of training data generated according to a distribution. Further, the method comprises generating, via a processor, a feature map by combining mapping functions corresponding to the plurality of layers into a vector of mapping function elements and mapping, by the feature map, the set of training data to a set of feature space training data in a feature space. Further, the method comprises identifying, via the processor, a hyper-ellipsoid in the feature space enclosing the feature space training data based on the generated feature map. In addition, the method comprises determining, via the processor, the first test data sample is OOD data when a mapped first test data sample in the feature space is outside the hyper-ellipsoid.

20 Claims, 8 Drawing Sheets

(56) References Cited

OTHER PUBLICATIONS

Liang, Peifeng, et al. "One-class classification using quasi-linear support vector machine." 2018 IEEE International Conference on Systems, Man, and Cybernetics (SMC). IEEE, 2018. (Year: 2018).*

Qi, Di, et al. "Imagebert: Cross-modal pre-training with large-scale weak-supervised image-text data." arXiv preprint arXiv:2001. 07966 (2020). (Year: 2020).*

Dolia, Alexander N., et al. "D-optimality for minimum vol. ellipsoid with outliers." Proc. 7th Int. Conf. Signal/Image Processing Pattern Recognition. 2004. (Year: 2004).*

Cai, Feiyang, and Xenofon Koutsoukos. "Real-time out-of-distribution detection in learning-enabled cyber-physical systems." 2020 ACM/IEEE 11th International Conference on Cyber-Physical Systems (ICCPS). IEEE, 2020. (Year: 2020).*

Kingma, Diederik P., and Max Welling. "Auto-encoding variational bayes." arXiv preprint arXiv:1312.6114 (2014). (Year: 2014).*

Wadlinger, E. Alan. General least-squares fitting procedures to minimize the vol. of a hyperellipsoid. No. LA-8096-MS. Los Alamos National Lab.(LANL), Los Alamos, NM (United States), 1979. (Year: 1979).*

Ryu, Seonghan, et al. "Neural sentence embedding using only in-domain sentences for out-of-domain sentence detection in dialog systems." Pattern Recognition Letters 88 (2017): 26-32. (Year: 2017).*

Zhu, Yukun, et al. "Aligning books and movies: Towards story-like visual explanations by watching movies and reading books." Proceedings of the IEEE international conference on computer vision. 2015. (Year: 2015).*

Golan, Izhak, and Ran El-Yaniv. "Deep anomaly detection using geometric transformations." Advances in neural information processing systems 31 (2018). (Year: 2018).*

Chen, Xiaoqing, Chunjie Cao, and Jianbin Mai. "Network anomaly detection based on deep support vector data description." 2020 5th IEEE International Conference on Big Data Analytics (ICBDA). IEEE, 2020. (Year: 2020).*

Chen et al., "A Simple Framework for Contrastive Learning of Visual Representations," arXiv preprint arXiv: 2002.05709, Jul. 2020, 20 pages.

Devlin et al., "BERT: Pre-training of Deep Bidirectional Transformers for Language Understanding," In Proceedings of the 2019 Conference of the North American Chapter of the Association for Computational Linguistics, May 24, 2019, 16 pages.

Dua et al., "DROP: A Reading Comprehension Benchmark Requiring Discrete Reasoning Over Paragraphs," arXiv preprint arXiv:1903. 00161, Apr. 16, 2019, 12 pages.

Emanuel Parzen, "On Estimation of a Probability Density Function and Mode," The annals of mathematical statistics, vol. 33, No. 3, 1962, pp. 1065-1076.

Golan et al., "Deep anomaly detection using geometric transformations," In Advances in Neural Information Processing Systems, Nov. 9, 2018, 17 pages.

Grathwohl et al., "Your classifier is secretly an energy based model and you should treat it like one," In International Conference on Learning Representations, 2020, 23 pages.

Guo et al., "On calibration of modern neural networks," In Proceedings of the 34th International Conference on Machine Learning, vol. 70, 2017, 14 pages.

He et al., "Momentum contrast for unsupervised visual representation learning," arXiv preprint arXiv:1911.05722, 2019, 11 pages.

He et al., "Rethinking imagenet pre-training," In Proceedings of the IEEE International Conference on Computer Vision, 2018, 10 pages.

Hendrycks et al., "A baseline for detecting misclassified and out-of-distribution examples in neural networks," In International Conference on Learning Representations, 2017, 12 pages.

Hendrycks et al., "Deep anomaly detection with outlier exposure," In International Conference on Learning Representations, URL https: //openreview. net/forum?id=HyxCxhRcY7, 2019, 18 pages.

Hendrycks et al., "Pretrained transformers improve out-of-distribution robustness," arXiv preprint arXiv:2004.06100, 2020, 11 pages.

Hendrycks et al., "Using pre-training can improve model robustness and uncertainty," In International Conference on Machine Learning, 2019, 12 pages.

Larson et al., "An evaluation dataset for intent classification and out-of-scope prediction," In Proceedings of the 2019 Conference on Empirical Methods in Natural Language Processing and the 9th International Joint Conference on Natural Language Processing (EMNLP-IJCNLP), 2019, 6 pages.

Lee et al., "A simple unified framework for detecting out-of-distribution samples and adversarial attacks," In Advances in Neural Information Processing Systems, 2018, 20 pages.

Liang et al., "Enhancing the reliability of out-of-distribution image detection in neural networks," In International Conference on Learning Representations, 2018, 15 pages.

Mahajan et al., "Exploring the limits of weakly supervised pretraining," In Proceedings of the Eu ropean Conference on Computer Vision (ECCV ), 2018, 13 pages.

Nalisnick et al., "Do deep generative models know what they don't know?" In International Conference on Learning Representations, 2019, 19 pages.

Rajpurkar et al., "Squad: 100,000+ questions for machine comprehension of text," arXiv preprint arXiv: 1606.05250, 2016, 10 pages.

Ren et al., "Likelihood ratios for out-of-distribution detection," In 33rd Conference on Neural Information Processing Systems (NeurIPS 2019), Vancouver, Canada, 2019, 21 pages.

Ruff et al., "Deep one-class classification. In International conference on machine learning," IProceedings of the 35 th International Conference on Machine Learning, Stockholm, Sweden, PMLR 80, 2018, 10 pages.

Saha et al., "DuoRC: Towards Complex Language Understanding with Paraphrased Reading Comprehension," In Meeting of the Association for Computational Linguistics (ACL), 2018 16 pages.

Scholkopf et al., "Estimating the support of a high-dimensional distribution," Neural computation, vol. 13, No. 7, 2001, 30 pages.

Serra et al., "Input complexity and out-of-distribution detection with likelihood-based generative models," In International Conference on Learning Representations, 2020 15 pages.

Sun et al., "Revisiting unreasonable effectiveness of data in deep learning era," In Proceedings of the IEEE international conference on computer vision, 2017, 13 pages.

Tax et al., "Support vector data description," Machine learning, vol. 54, No. 1, 2004, pp. 45-66.

Trischler et al., "Newsqa: A machine comprehension dataset," arXiv preprint arXiv:1611.09830, 2016, 12 pages.

Yang et al., "Hotpotqa: A dataset for diverse, explainable multi-hop question answering," arXiv preprint arXiv:1809.09600, 2018, pp. 2369-2380.

Yang et al., "Xlnet: Generalized autoregressive pretraining for language understanding," In 33rd Conference on Neural Information Processing Systems (NeurIPS 2019), Vancouver, Canada, 2019, 18 pages.

Zhai et al., "Deep structured energy based models for anomaly detection," In Maria Florina Balcan and Kilian Q. Weinberger (eds.), Proceedings of The 33rd International Conference on Machine Learning, vol. 48 of Proceedings of Machine Learning Research, 2016, 10 pages.

Zong et al., "Deep autoencoding gaussian mixture model for unsupervised anomaly detection," In International Conference on Learning Representations, URL https://openreview.net/forum?id= BJJLHbbO-, 2018, 19 pages.

* cited by examiner

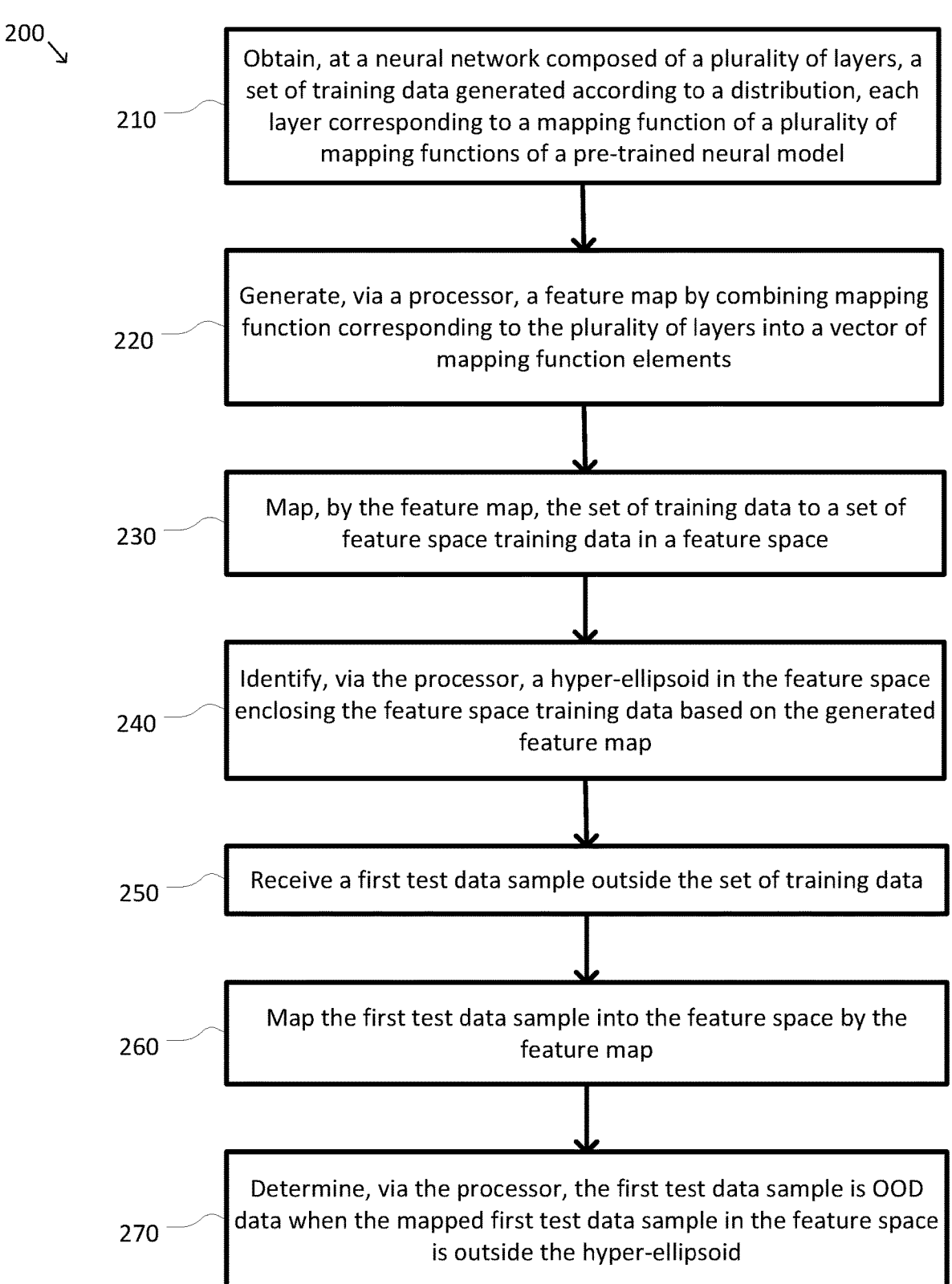

200

210 — Obtain, at a neural network composed of a plurality of layers, a set of training data generated according to a distribution, each layer corresponding to a mapping function of a plurality of mapping functions of a pre-trained neural model 220 — Generate, via a processor, a feature map by combining mapping function corresponding to the plurality of layers into a vector of mapping function elements 230 — Map, by the feature map, the set of training data to a set of feature space training data in a feature space 240 — Identify, via the processor, a hyper-ellipsoid in the feature space enclosing the feature space training data based on the generated feature map 250 — Receive a first test data sample outside the set of training data 260 — Map the first test data sample into the feature space by the feature map 270 — Determine, via the processor, the first test data sample is OOD data when the mapped first test data sample in the feature space is outside the hyper-ellipsoid

| | OC-SVM | FLOC | Deep SVDD | Geometric | DAGMM | DSEBM | GTMH | OODDM |
|---|---|---|---|---|---|---|---|---|
| Airplane | 65.6 | 69.7 | 61.7 | 76.2 | 41.4 | 56.0 | 75.0 | 80.7 |
| Automobile | 40.9 | 90.7 | 65.9 | 84.8 | 57.1 | 48.3 | 91.6 | 94.7 |
| Bird | 65.3 | 80.2 | 50.8 | 77.1 | 53.8 | 61.9 | 81.9 | 83.2 |
| Cat | 50.1 | 73.7 | 59.1 | 73.2 | 51.2 | 50.1 | 75.7 | 75.7 |
| Deer | 75.2 | 88.1 | 60.9 | 82.8 | 52.2 | 73.3 | 87.7 | 91.1 |
| Dog | 51.2 | 84.8 | 65.7 | 84.8 | 49.3 | 60.5 | 88.2 | 88.6 |
| Frog | 71.8 | 84.3 | 67.7 | 82.0 | 64.9 | 68.4 | 85.3 | 92.2 |
| Horse | 51.2 | 93.0 | 67.3 | 88.7 | 55.3 | 53.3 | 95.3 | 95.6 |
| Ship | 67.9 | 89.7 | 75.9 | 89.5 | 51.9 | 73.9 | 92.3 | 91.8 |
| Truck | 48.5 | 87.8 | 73.1 | 83.4 | 54.2 | 63.6 | 89.5 | 92.5 |
| Mean | 58.8 | 84.2 | 64.8 | 82.3 | 53.1 | 60.9 | 86.2 | 88.6 |

*FIG. 3*

Algorithm 1 Out-of-distribution detection with pre-trained model

Required: In-distribution dataset $\mathcal{D}_n = \{x_i\}_{i=1}^n$, Pre-trained Model $f(x) = f_L \circ f_{L-1} \circ \cdots \circ f_1(x)$, Test dataset $D = \{y_i\}_{i=1}^n$.

Calculate $\{M(x_i)\}_{i=1}^n$, where $M(x_i) = [M_1(x_i), M_2(x_i) \cdots M_L(x_i)]^\top$ and $$M_\ell(x) = (f_\ell \circ f_{\ell-1} \cdots \circ f_1(x) - \hat{c}_\ell)\Sigma_\ell^{-1}(f_\ell \circ f_{\ell-1} \cdots \circ f_1(x) - \hat{c}_\ell)$$

where $\hat{c}_\ell$ and $\Sigma_\ell$ is the empirical mean and empirical covariance

Solve the one-class SVM problem:

$$\min_{R,w,\xi} \frac{1}{2}\|w\|^2 + R^2 + \frac{1}{\nu n}\sum_i \xi_i, \quad \text{s.t.} \quad \langle w, M(x_i)\rangle \leq R^2 + \xi_i, \ \xi_i \geq 0, \forall i,$$

and find the optimal $w$, $R^2$.

Output: Anomaly score $\{\langle w, M(y_i)\rangle\}_{i=1}^m$ and the prediction $\{1_{\langle w, M(y_i)\rangle \leq R^2}\}_{i=1}^m$ (the prediction of $y_i$ is 1 means $y_i$ is in-distribution data).

| $D_{in}$ | $D_{out}^{test}$ | TNR (TPR 95%)↑ | | | | | AUROC↑ | | | | | Detection Acc↑ | | | | |
|---|---|---|---|---|---|---|---|---|---|---|---|---|---|---|---|---|
| | | MSP | ODIN | GTMH | Maha Dist | OODDM | MSP | ODIN | GTMH | Maha Dist | OODDM | MSP | ODIN | GTMH | Maha Dist | OODDM |
| CIFAR10 | TinyImageNet (crop) | 79.8 | 96.2 | 96.0 | 100 | 100 | 97.0 | 99.1 | 98.6 | 99.9 | 100 | 92.6 | 95.7 | 95.5 | 99.6 | 99.4 |
| | TinyImageNet (resize) | 66.6 | 91.6 | 88.1 | 94.6 | 90.8 | 95.0 | 98.0 | 97.3 | 98.9 | 97.6 | 89.4 | 93.6 | 92.6 | 94.8 | 93.1 |
| | LSUN (crop) | 82.3 | 96.3 | 97.3 | 99.9 | 100 | 97.3 | 99.0 | 98.9 | 99.9 | 99.9 | 93.1 | 95.7 | 96.1 | 99.7 | 99.1 |
| | LSUN (resize) | 78.3 | 96.1 | 92.9 | 95.1 | 92.3 | 96.7 | 99.0 | 98.0 | 98.8 | 98.1 | 92.0 | 95.7 | 94.3 | 95.1 | 93.9 |
| | Gaussian | 100 | 100 | 100 | 100 | 100 | 98.4 | 100 | 99.1 | 100 | 100 | 97.8 | 99.7 | 99.2 | 100 | 100 |
| | SVHN | 84.5 | 95.3 | 98.1 | 95.8 | 94.5 | 97.2 | 98.6 | 98.9 | 99.1 | 98.9 | 93.7 | 95.3 | 96.6 | 95.4 | 95.0 |

| Data | Method | TNR (TPR 95%) | AUROC | Accuracy |
|------|--------|---------------|-------|----------|
| Full | MSP | 84.5 | 96.2 | 91.2 |
|      | MTS | 86.9 | 97.2 | 92.2 |
|      | FLOC | 47.2 | 68.0 | 72.6 |
|      | OODDM | 87.6 | 97.1 | 92.2 |
| Small | MSP | 81.7 | 94.7 | 89.9 |
|       | MTS | 85.8 | 95.9 | 91.1 |
|       | FLOC | 28.7 | 54.2 | 79.9 |
|       | OODDM | 86.9 | 97.0 | 92.0 |
| Imbal | MSP | 55.7 | 90.0 | 82.2 |
|       | MTS | 59.4 | 90.3 | 82.6 |
|       | FLOC | 35.8 | 59.9 | 66.7 |
|       | OODDM | 85.3 | 97.0 | 91.7 |

*FIG. 6*

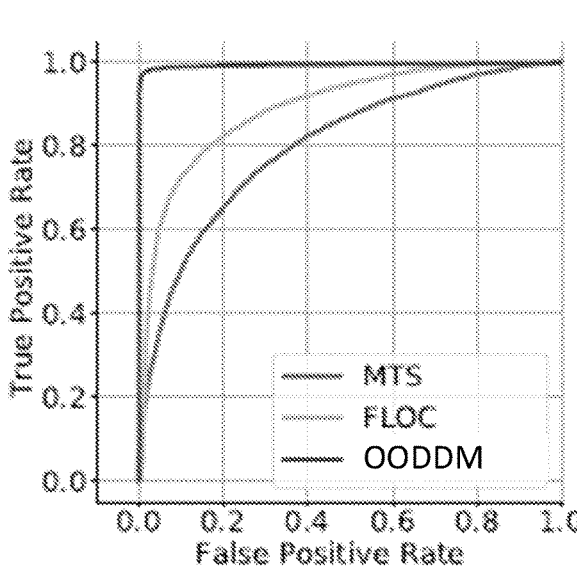
FIG. 7A
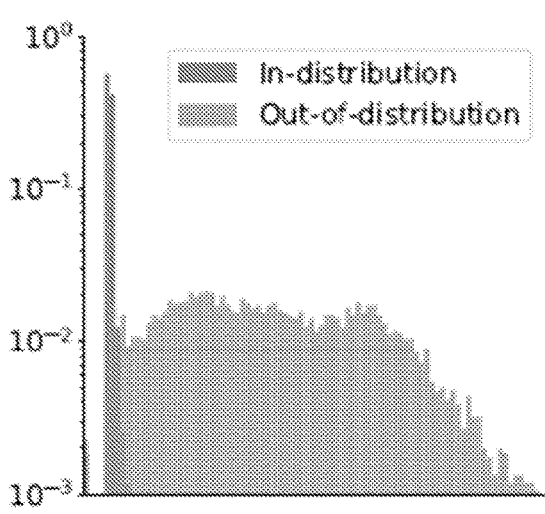
FIG. 7B
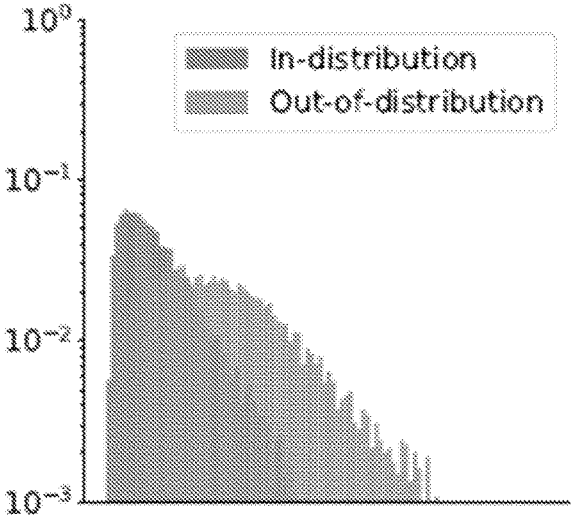
FIG. 7C
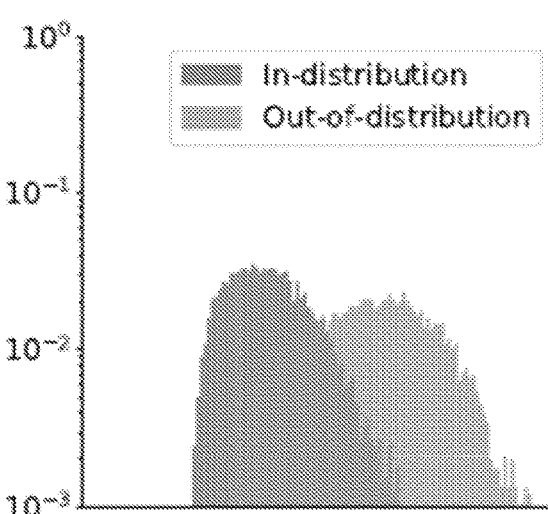
FIG. 7D

| $\mathcal{D}_{in}$ | $\mathcal{D}_{out}^{test}$ | TNR (TPR 95%) ↑ | | | | AUROC ↑ | | | | AUPR IN ↑ | | | | AUPR OUT ↑ | | | |
|---|---|---|---|---|---|---|---|---|---|---|---|---|---|---|---|---|---|
| | | MSP | MTS | FLOC | Ours | MSP | MTS | FLOC | Ours | MSP | MTS | FLOC | Ours | MSP | MTS | FLOC | Ours |
| SQuAD | HotpotQA | 59.1 | 59.1 | 60.7 | 98.4 | 86.4 | 86.4 | 89.1 | 99.2 | 85.8 | 85.8 | 91.4 | 97.8 | 86.8 | 86.8 | 83.6 | 99.1 |
| | NewsQA | 39.4 | 39.4 | 41.3 | 61.0 | 72.6 | 72.6 | 70.9 | 79.4 | 81.7 | 81.7 | 80.0 | 81.3 | 66.1 | 66.1 | 59.4 | 78.6 |
| | DROP | 9.5 | 9.5 | 11.0 | 66.6 | 48.1 | 48.1 | 50.6 | 87.3 | 47.0 | 47.0 | 52.6 | 82.7 | 53.4 | 53.4 | 51.4 | 86.1 |
| | BoolQ | 2.9 | 10.7 | 10.7 | 40.9 | 19.9 | 39.6 | 51.0 | 67.5 | 58.2 | 63.7 | 77.2 | 77.9 | 17.2 | 30.8 | 28.1 | 52.5 |
| | DuoRC | 42.3 | 42.3 | 49.2 | 74.5 | 75.8 | 75.8 | 74.8 | 87.0 | 64.7 | 64.7 | 61.2 | 69.6 | 84.0 | 84.0 | 82.0 | 92.9 |

SYSTEMS AND METHODS FOR OUT-OF-DISTRIBUTION DETECTION

CROSS-REFERENCE TO RELATED APPLICATIONS

The present application claims priority to and the benefit of the U.S. Provisional Patent Application No. 63/032,696, filed May 31, 2020, titled "Systems and Methods for Out-of-Distribution Detection," which is hereby incorporated by reference herein in its entirety.

TECHNICAL FIELD

The present disclosure relates generally to machine learning models and neural networks, and more specifically, to out-of-distribution detection of data using ellipsoidal data description with pre-trained models.

BACKGROUND

Artificial intelligence, implemented with neural networks and deep learning models, has been widely applied to automatically analyze real-world information with or approaching human-like accuracy. Specifically, a machine learning model may receive input data, e.g., a natural language question, an image, etc., and classify the input data as one of a set of pre-defined classes. This process is referred to as classification. Machine learning models may perform well when the training and testing data are sampled from the same distribution, e.g., when the training data and testing data largely fall within the scope of the same set of pre-defined classes. However, as real-world applications of the models can involve different datasets, which may exhibit different distribution than the distribution of training datasets, such applications may fail at machine learning models that are pre-trained with in-distribution training datasets only. Thus, the detection of out-of-distribution data is an important component of the deployment of AI in real world scenarios.

BRIEF DESCRIPTION OF THE DRAWINGS

FIG. 2 is a simplified flowchart of a method for out-of-distribution data detection according to some embodiments of the present disclosure.

FIG. 3 shows an example data table illustrating a one-class classification out-of-distribution data detection, according to one embodiment.

FIG. 4 shows an example algorithm for out-of-distribution data detection according to some embodiments of the present disclosure.

FIG. 5 shows an example data table illustrating a multi-class out-of-distribution image detection, according to one embodiment.

FIG. 6 shows an example data table illustrating an intent classification out-of-domain query detection, according to one embodiment.

FIGS. 7A, 7B, 7C, 7D show example plots illustrating out-of-domain question detection for question answering systems, according to one embodiment.

FIG. 8 shows an example data table illustrating out-of-domain question detection for question answering systems, according to one embodiment.

Figure 1:
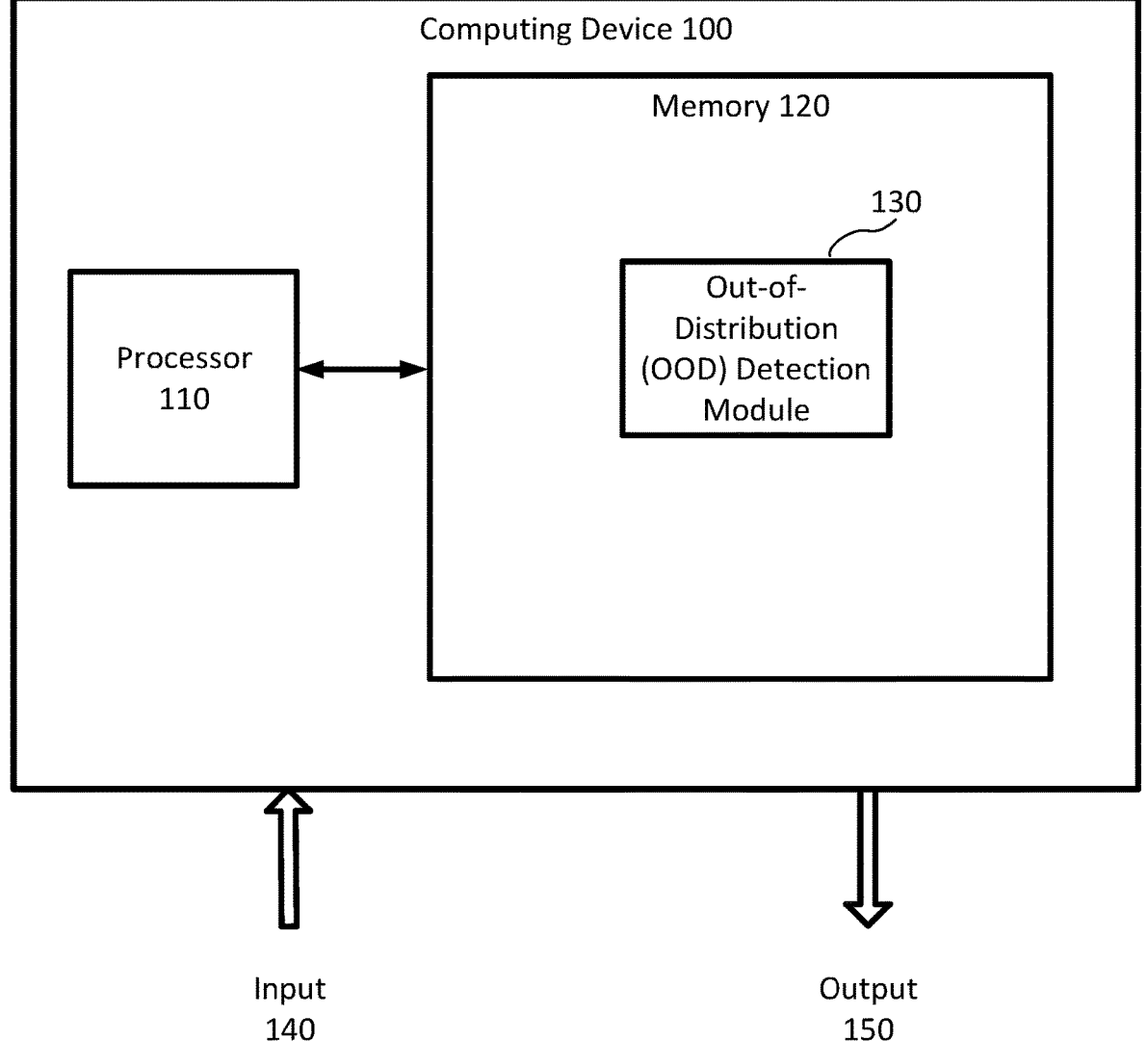
FIG. 1 is a simplified diagram of a computing device according to some embodiments of the present disclosure.

In the figures and appendix, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Artificial intelligence, implemented with neural networks and deep learning models, has demonstrated great promise as a technique for automatically analyzing real-world information with or approaching human-like accuracy. In general, such neural network and deep learning models receive input information and make predictions based on the same. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples as a human might make Neural network models have been shown to outperform and/or have the potential to outperform other computing techniques in a number of applications.

Machine learning models may perform well when the training data and the testing data are sampled from the same distribution, i.e., when the same distribution is used to generate the training data and the testing data. In other words, machine learning models function well in static situations where the input distribution generating test data at testing time is same as the training distribution generating the training data for model training. The real world, however, can be dynamic and complex where data distributions shift over time or even new categories of objects may appear after model training at testing time. In such cases, pre-trained neural networks may still classify inputs from unknown classes into known classes incorrectly but with high confidence, potentially resulting in catastrophic failures during real world deployments of the models. For example, a traffic sign classification model for an autonomous driving system may predict a traffic sign with a high-speed limit for a scene in real life that does not contain any such signs, with obvious potentially catastrophic consequences. As such, detecting such out-of-distribution (OOD) data, i.e., detecting or finding patterns in data that do not conform to expected behavior, can be an important aspect of the application of machine learning models in various real-life scenarios.

Previously developed approaches for OOD detection, however, can have several drawbacks. For example, some approaches may fail for OOD detection applications involving high-dimensional scenarios (e.g., texts and images). Other approaches, for example approaches deploying unsupervised OOD methods, have been known to exhibit pathological behavior such as having higher confidence on specific type of the OOD data than the in-distribution data. And yet other approaches may require additional OOD data as negative samples, limiting their application in several real-world scenarios. Further, because the algorithms of classifier-based approaches depend on properties of multi-class classifiers, such approaches may not be applicable to cases such as one-class classification, out-of-domain question detection for question answering, etc., when one cannot access label information.

To address these challenges, embodiments described herein provide an approach and/or framework that leverages the representation power of existing pre-trained models or neural networks for OOD detection. Specifically, a hyper-ellipsoid structure in the feature space is utilized to distinguish in-distribution or OOD. The hyper-ellipsoid based approach may be generalized to a wide range of classifiers, and to non-classification tasks such as but not limited to Question Answering. In addition, the approach may be applicable whether the pre-trained models are obtained under supervised setting or non-supervised setting. Further, unlike most existing systems, the hyper-ellipsoid based approach may not need specific OOD samples to pre-train a model, facilitating the approach's application to real world scenarios.

According to some embodiments, the systems and methods of the present disclosure employ an ellipsoid data description technique with a pre-trained method for OOD detection of a testing data, i.e., determining whether the testing data can be obtained from the distribution that generated the training data used to train the pre-trained model. The ellipsoid data description technique may allow the determination of an optimal hyper-ellipsoidal space in feature space that may include at least a portion (e.g., most or all) of the data in the feature space, where the data in the feature space are mappings of the training data (e.g., as mapped via a feature map). In some embodiments, the testing data may be determined to not be an OOD data or to be an OOD data based on whether the mapping of the testing data in feature space is enclosed or is not enclosed within the optimal hyper-ellipsoidal space, respectively.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes an out-of-distribution (OOD) detection module 130 that may be used to implement and/or emulate the neural network systems and models described further herein and/or to implement any of the methods described further herein, such as but not limited to the method described with reference to FIG. 2. OOD detection module 130 may be used, in some examples, for OOD detection in settings such as but not limited to one-class classification, multi-class image classification, multi-class text classification, out-of-domain question detection for question answering, and/or the like.

In some examples, memory 120 may include non-transitory, tangible, machine readable media that includes executable code that when run by one or more processors (e.g., processor 110) may cause the one or more processors to perform the methods described in further detail herein. In some examples, OOD detection module 130 may be implemented using hardware, software, and/or a combination of hardware and software. As shown, computing device 100 receives input 140, which is provided to OOD detection module 130, which then may generate output 150.

In some embodiments, the input 140 may include testing data and training data, or a collection of data including training data for training a neural network. The types of testing data and/or the types of the collection of data including the training data can be of any kind, including but not limited to images, texts, etc. The output 150 can include a determination of whether the testing data is an out-of-distribution data or not, i.e., whether the testing data is generated based on the same distribution used to generate the collection of data including the training data. In other examples, the output 150 may include a classification output from the pre-trained base model.

FIG. 2 is a simplified diagram of a method 200 for OOD detection, according to some embodiments. One or more of the processes of method 200 may be implemented, at least in part, in the form of executable code stored on non-transitory, tangible, machine-readable media that when run by one or more processors may cause the one or more processors to perform one or more of the processes. In some embodiments, method 200 corresponds to the operation of OOD detection module 130 (FIG. 1) to perform an OOD detection task.

Referring to FIG. 2, at process 210, the OOD detection module may obtain, at a neural network composed of a plurality of layers, a set of training data generated according to a distribution, each layer corresponding to a mapping function of a plurality of mapping functions of a pre-trained neural model. In some embodiments, the set of training data may include a collection of training data for training a neural network that has a plurality of layers. For example, the collection of data $\mathcal{D}_n = \{x_i\}_{i=1}^n$, and a pre-trained model f may be pre-trained on the data $\mathcal{D}_n$ (or the data X). The pre-trained model f may be a neural network with L layers, i.e. $f = f_L \circ f_{L-1} \circ \ldots f_1$, where $f_j$ is the function corresponding to the j-th layer and the symbol $\circ$ denotes a composition function (i.e., $f \circ g(x) = f(g(x))$).

In such embodiments, the OOD detection module may be tasked to determine whether a new data y is generated by the same distribution that generated $\mathcal{D}_n$. In some cases, the OOD detection module may have access only to the pretrained model f and in particular may not have knowledge of or access to data samples (e.g., such as outlier samples). For example, for non-classification tasks (e.g., question answering), the OOD detection module may not have access to adversarial outliers. In some embodiments, however, the OOD detection module may have access to outlier samples (e.g., adversarial outliers), such as in the cases of classification tasks (e.g., one-class classification, multi-class image/text classification, etc.).

At process 220, the OOD detection module may generate, via a processor, a feature map by combining mapping functions corresponding to the plurality of layers into a vector of mapping function elements. In some cases, the feature map may be generated using the feature before the softmax layer as the feature of the data, i.e., $\phi(x)=f(x)$, where $\phi(x)$ is the feature map. However, it may be desirable to generate the feature map using multiple layers of the plurality of layers, because outputs from different layers can provide information related to different levels of a feature. For example, for convolutional neural networks that may be used in the image domain, the bottom layer may provide texture information of a feature, while the top layer may provide shape information of the feature. As such, an improved feature map that can utilize the feature from most or all of the different layers of neural network may be generated.

In some embodiments, the vector of mapping function elements of the feature map may be generated at least in part by performing a function composition of two or more mapping functions of the plurality of mapping functions to form a mapping function element in the vector. For instance, the feature map may contain mapping function elements that are function compositions of functions corresponding to layers of the neural network. An example of such an improved feature map can include the features from different layers and be expressed as $$\phi(x)=[f_1(x), f_2 \circ f_1(x), \ldots, f_L \circ f_{L-1} \circ \ldots \circ f_1(x)] \qquad \text{(Eq. 1)}$$

At process 230, the OOD detection module may map, by the feature map (e.g., the improved feature map $\phi(x)$), the set of training data to a set of feature space training data in a feature space. That is, the set of training data x may be mapped to the set of feature space training data as shown in the equation above by the feature map data $\phi(x)$.

At process 240, the OOD detection module may identify, via the processor, a hyper-ellipsoid in the feature space enclosing the feature space training data based on the generated feature map. In some cases, one may employ one-class support vector machine (SVM) techniques to determine whether y is an OOD data, which may include finding a hyper-plane in feature space separating the in-distribution data from the out-of-distribution data. In some cases, one may employ support vector data description (SVDD) techniques to find a hypersphere in feature space that can separate the in-distribution data from the out-of-distribution data. In some cases, however, such hyper-surfaces may not be able to separate features provided by deep models. In some embodiments, a hyper-ellipsoid in feature space can be used to separate the in-distribution data from the out-of-distribution data, such hyper-ellipsoid defined by the expression or equation $$\|\phi(x)-c\|_{\Sigma^{-1}}^2=(\phi(x)-c)^T\Sigma^{-1}(\phi(x)-c)=R^2, \qquad \text{(Eq. 2)}$$

where c is the center of the hyper-ellipsoid, $\Sigma$ is a symmetric positive definite matrix that reflects the shape of the hyper-ellipsoid and R reflects the volume of the hyper-ellipsoid. In some cases, $\|\Sigma\|=1$ where the norm can be operator norm, Frobenius norm or the operator norm, which can give the definition of the hyper-ellipsoid with unique $\Sigma$ and R. In some embodiments, the hyper-ellipsoid that separates in-distribution data from OOD may be an optimal hyper-ellipsoid obtained from the expression $$\min_{R,c,\Sigma,\xi} 0.5\|\sum\|_{Fr}^2 + \left(R^2 + \frac{1}{vn}\sum_i \xi_i\right), \qquad \text{(Eq. 3)}$$

$$\text{subject to the constraint } \|\phi(x_i) - c\|_{\Sigma^{-1}}^2 \le R^2 + \xi_i, \xi_i \ge 0, \forall i.$$

In some cases, the regularization term $0.5\|\Sigma\|_{Fr}^2$ may serve to constrain the complexity of $\Sigma$, $\xi_i$ are slack variables that allow the margin to be soft, and $v \in (0,1]$ is a hyper-parameter that balance the penalties and the radius.

At process 250, the OOD detection module may receive a first test data sample outside the set of training data. For example, the OOD detection module may receive data sample y that is not from $\mathcal{D}_n$ for determining whether data sample y is generated by the same distribution that generated $\mathcal{D}_n$.

At process 260, the OOD detection module may map the first test data sample into the feature space by the feature map. For example, the OOD detection module may apply the feature map of Eq. 1 to the new data sample y, i.e., $\phi(y)=[f_1(y), f_2 \circ f_1(y), \ldots, f_L \circ f_{L-1} \circ \ldots \circ f_1(y)]$ At process 270, the OOD detection module may determine, via the processor, that the first test data sample is OOD data when the mapped first test data sample in the feature space is outside the hyper-ellipsoid. For example, as discussed above, the OOD detection module may solve Eq. 3 to identify the optimal hyper-ellipsoid (for example, by determining R, c, and $\Sigma$ that satisfy Eq. 3), and determine whether the new data sample y is OOD data or not by determining whether $\phi(y)$ is outside of or enclosed by the optimal hyper-ellipsoid. That is, in some embodiments, the OOD detection module may determine that the new data sample y (e.g., which is not from $\mathcal{D}_n$) is an OOD data if the $\phi(y)$ is not enclosed by the optimal hyper-ellipsoid $\|\phi(x)-c\|_{\Sigma^{-1}}^2=R^2$.

In some embodiments, the set of training data includes a single class training dataset; and the pre-trained neural model is a classifier neural model pre-trained with the single class training dataset. In some embodiments, the set of training data includes a multi-class training dataset; and the pre-trained neural model is a classifier neural model pre-trained with the multi-class training dataset. In some embodiments, the set of training data includes an intent classification training dataset; and the pre-trained neural model is a classifier neural model pre-trained with the intent classification training dataset. In some embodiments, the set of training data includes a question answering training dataset; and the pre-trained neural model is a non-classifier neural model pre-trained with the question answering training dataset. In some embodiments, the pre-trained neural model is a non-classifier neural model pre-trained with data lacking an OOD sample. Some embodiments of method 200 further comprise determining one hyper-ellipsoid that has a smallest volume among a set of candidate hyper-ellipsoids that enclose the feature space training data in the feature space as the hyper-ellipsoid.

In some embodiments, solving Eq. 3 exactly to identify the optimal hyper-ellipsoid may be a computationally challenging or even intractable problem, because solving the equation may involve finding an optimal $\Sigma$ of shape d×d, where d is the dimension of the feature and can have values up to tens or hundreds of thousands. In some embodiments, an efficient approximation scheme that renders Eq. 3 computationally tractable includes decomposing the feature space into several subspaces based on the feature from different layers of the neural network. For example, $\Sigma$ may be assumed to be a block diagonal matrix, $$\sum = \begin{bmatrix} \Sigma_1 & & & \\ & \Sigma_2 & & \\ & & \ddots & \\ & & & \Sigma_L \end{bmatrix},$$ (Eq. 4)

where $\Sigma_l$ reflects the shape of feature distribution at layer 1, which may allow for $\|\phi(x)-c\|_{\hat{\Sigma}^{-1}}^2$ to be expressed or solved as $\|\phi(x)-c\|_{\hat{\Sigma}^{-1}}^2 = \Sigma_{l=1}^L \|f_l \circ f_{l-1} \ldots \circ f_1(x)-c_l\|_{\Sigma_l^{-1}}^2$. In some embodiments, the approximation may also include the following assumptions, which are based on the understanding that $c_l$ and $\Sigma_l$ may not deviate substantially from the empirical mean and covariance estimations $\hat{c}_l$ and $\hat{\Sigma}_l$ of the training data, $$c_l = \hat{c}_l = \frac{1}{2} \sum_{i=1}^n [f_l \circ f_{l-1} \ldots \circ f_1(X_i)],$$ (Eq. 5)

$$\sum_l = \frac{\hat{\Sigma}_l}{w_l} = \frac{1}{(n-1)w_1} \sum_{i=1}^n [(f_l \circ f_{l-1} \ldots \circ f_1(X)-c_l)$$
$$(f_l \circ f_{l-1} \ldots \circ f_1(X)-c_l)^T].$$ (Eq. 6)

where $w_l$ is a layer-dependent constant. With these approximations, in some cases, the problem of solving Eq. 3 becomes at least substantially equivalent to the problem of finding the proper $\{w_l\}_{l=1}^L$ the corresponding R and $\{\xi_i\}_{i=1}^n$, which is a low dimensional optimization problem that scales only with the number of layer L linearly. In some embodiments, with the definitions $w=[w_1, w_2, \ldots, w_L]^T$, $M_l(x_i)=(f_l \circ f_{l-1} \ldots \circ f_1(x_i)-\hat{c}_l)^T \hat{\Sigma}_l^{-1} (f_l \circ f_{l-1} \ldots \circ f_1(x_i)-\hat{c}_l)$ and $M(x)=[M_1(x), M_2(x), \ldots, M_L(x)]^T$, $\|\phi(x)-c\|_{\Sigma^{-1}}^2$ may be expressed as:

$$\|\phi(x)-c\|_{\Sigma^{-1}}^2 = \langle w, M(x) \rangle.$$

In some embodiments, because $$\left\| \sum \right\|_{Fr}^2 = \sum \frac{\left\| \hat{\Sigma}_l \right\|_{Fr}^2}{w_l^2}$$

is not convex with respect to w, $-\frac{1}{2} \|w\|_2^2$ may be minimized to have similar or same regularization effect on $\Sigma$ (e.g., because $\|w\|_2$ being small is equivalent to $\|\Sigma\|_{Fr}^2$ being too large). Combining the foregoing, eq. 3 may be re-expressed as:

$$\min_{R,c,\xi} -\frac{1}{2}\|w\|_2^2 + R^2 + \frac{1}{vn}\sum_i \xi_i,$$ (Eq. 7)

subject to the constraint $\langle w, M(x_i) \rangle \le R^2 + \xi_i, \xi_i \ge 0, \forall_i$.

In some embodiments, Eq. 7 may be viewed as a one-class SVM with linear kernel that can be solved with convex optimization methods. In some case, to determine whether a new data sample y is OOD or not, R and w for the new data sample y may be determined and $S(y)=\langle w, M(Y) \rangle -R^2$ may be used as the anomaly score (e.g., for determining whether y is an anomaly, i.e., not from the distribution that generated x).

In some embodiments, if the feature of the data x is assumed to follow a Gaussian distribution, i.e. $\phi(x) \sim \mathcal{N}(c, \Sigma)$ where c and $\Sigma$ are the mean and the covariance of the Gaussian distribution, then the above method or formulation may include or be connected to density estimation (e.g., Gaussian density estimation). That is, the formulation may include or be related to estimating the density of the data x by assuming the feature of the data follows a (layer-wise factorized) Gaussian distribution, and then identifying data with likelihood smaller than the threshold as OOD data. To show this, with the assumption of Gaussian distribution, the log-density of $p(\phi(x))$ can be written as:

$$\log p(\phi(x))=-\frac{1}{2}(\phi(x)-c)^T\Sigma^{-1}(\phi(x)-c)+\log Z=-\frac{1}{2}\|\phi(x)-c\|_{\Sigma^{-1}}^2+\log Z,$$

where Z is the normalization constant (e.g., the partition function) that is independent of $\phi(x)$. In such cases, the above-noted approximation of decomposing the feature space into several subspaces may be related or equivalent to introducing an additional assumption that the feature from each layer is approximately independent, i.e., $p(\phi(x)) \approx \Pi_{l=1}^L p(f_l \circ f_{l-1} \ldots \circ f_1(x))$. As such, $$\log p(\phi(x)) \approx \sum_{l=1}^L \log p(f_l \circ f_{l-1} \ldots \circ f_1(x)) =$$
$$-\frac{1}{2}\sum_{l=1}^L (f_l \circ f_{l-1} \ldots \circ f_1(x)-c_l)^T \sum_l^{-1} (f_l \circ f_{l-1} \ldots \circ f_1(x)-c_l) + \log Z.$$

FIG. 3 shows an example data table illustrating a one-class classification out-of-distribution data detection, according to one embodiment. In some embodiments, ten different one-class classification tasks are created using the ten different classes from the Canadian Institute for Advanced Research (CIFAR)-10 dataset. Further, for each task, a model is trained on one of the classes while the samples from the remaining classes are treated as OOD samples. The methods of OOD detection disclosed in the subject application (e.g., method 200 executed by OOD detection module 130) may then be applied on the trained models. FIG. 3 shows performance comparison of OOD detection by the methods disclosed herein (OOD detection module (OODDM)) with various other methods, such as the one-class support vector machine (OC-SVM), deep SVDD, features from last layers (FLOC), geometric transformations ("geometric"), deep structured energy-based model (DSEBM), deep autoencoding Gaussian mixture model (DAGMM), and geometric transformation with multiple softmax heads (GTMH). OC-SVM is a classic unsupervised kernel method for out-of-distribution detection technique learns a collection of closed sets in the raw pixel input space. Deep SVDD learns features from deep convolution networks using a similar objective as that of the classic SVDD. DSEBM learns a structured deep energy model, which outputs the energy function (negative log probability) associated with an input sample, and can be utilized as the anomaly score for OOD detection. DAGMM jointly learns a low-dimensional representation of the training data and a Gaussian mixture model on the representation to perform density estimation. Geometric Transformations trains neural nets with self-supervised training techniques to predict image transformations such as rotations and translations, and calculates the total conditional log-likelihood of each transformation as the anomaly score, assuming the conditional distribution follows Dirichlet distribution whose parameters are estimated via the maximum likelihood principle. GTMH improves upon the geometric transformation prediction idea by predicting rotation and translations separately using three softmax heads. In contrast to the Geometric Transformations, GTMH calculates the anomaly score by adding the softmax score assigned to the transformations together. FLOC utilizes the features from the final layer of the same pre-trained model for one-class SVM.

In some embodiments, the results depicted in FIG. 3 may be obtained using the self-supervised training process and network structures discussed in Hendrycks et al., *Using pre-training can improve model robustness and uncertainty*, International Conference on Machine Learning, pp. 2712-2721 (2019), the disclosure of which is incorporated by reference herein in its entirety. In some embodiments, the backbone architecture can be a 16-4 WideResNet trained with a dropout rate of 0.3 (WideResNet is discussed in S. Zagoruyko and N. Komodakis, *Wide residual networks*, arXiv:1605.07146 (2016), which is incorporated by reference herein in its entirety). Further, networks can be trained with a cosine learning rate schedule, an initial learning rate of 0.1, Nesterov momentum, and a batch size of 128. Data may be augmented with standard cropping and mirroring. For self-supervised loss, the geometric transformations may be predicted, which contain rotations, vertical and horizontal translations. The three types of transformations can be composed together, and the network may have softmax head for each types of transformation, and the loss may be weighted by 1:1:1. In some instances, the networks may be trained for 200 epochs, which can have the best performance for the baseline methods.

In some embodiments, the results depicted in FIG. 3 can be obtained by tuning the parameter $v$ from $\{10^{-5}, 10^{-3}, 10^{-1}\}$. After training, for GTMH, test examples may be rotated 0°, 90°, 180°, or 270°, and then translated 0±8 pixels vertically and horizontally, for a total of 36 types of transformations. In some cases, the corresponding softmax predicted probability for each transformation may be summed up as the final abnormal score for GTMH. For OODDM, in some embodiments, the same pre-trained model as that of GTMH may be used with only 4 rotation transformations. Given each training image x, the four rotation transformations may be applied to generate four different rotation images $x_0°$, $x_{90}°$, $x_{180}°$, or $x_{270}°$. Further, $M(x_{total})=[M(x_0°)$, $M(x_{90}°), M(x_{180}°), M(x_{270}°)]^T$ may be calculated and Eq. 3 may be solved to obtain the optimal w. For a given test image y (i.e., test sample y to be determined whether it is OOD data or not), $M(y_{total})$ and the corresponding optimized w may be calculated to determine the final abnormality score identifying whether y is OOD data or not. An example detailed algorithm that may be utilized by OODDM to determine whether data sample y is OOD data or not with respect to the in-distribution dataset $\mathcal{D}_n=\{x_i\}_{i=1}{}^n$ is shown in FIG. 4.

In some embodiments, FIG. 3 shows a data table including area under the receiver operating characteristic curve (AUROC) for the methods mentioned above. The figure illustrates that utilizing the same pre-trained models as the other methods, the method disclosed in the present disclosure, OODDM, can outperform softmax based calibrated anomaly scores, and also FLOC. In some cases, OODDM achieves such state-of-art performance without having OOD samples to perform supervised learning.

FIG. 5 shows an example data table illustrating a multi-class out-of-distribution image detection, according to one embodiment. In some embodiments, the multi-class out-of-distribution image detection scheme may include considering the whole CIFAR-10 dataset as an in-distribution data and determining whether a new test data is OOD data or not, i.e., whether the new test data is from the distribution of the CIFAR-10 dataset. The data table of FIG. 5 shows results of tests done on several different natural image datasets as well as synthetic noise datasets, including Tiny ImageNet, Large-Scale Understanding Challenge (LSUN), Gaussian and Street View House Numbers (SVHN). For Tiny ImageNet and LSUN, the images were randomly cropped or resized to 32×32, resulting in four datasets, TinyImageNet (crop), TinyImageNet (resize), LSUN (crop), LSUN (resize).

As discussed above, in some embodiments, OODDM, the OOD detection method disclosed in the present disclosure, may not require accessing outlier samples. FIG. 5 shows results comparing OODDM with other out-of-distribution detectors that may also not require accessing outlier samples, such as but not limited to class-dependent Mahalanobis distance ("Maha Dist"), "MSP" where maximum softmax probability (MSP) of a classifier is used given an input sample, ODIN (out-of-distribution image detection) which further extends MSP by adding temperature scaling in the softmax function and noise perturbations to the input image. In some embodiments, GTMH includes using auxiliary self-supervised rotation loss to improve the OOD detection ability, and then combining the rotation prediction with the label prediction scores as the new anomaly scores.

In some embodiments, Mahalanobis distance can be used to measure the distance between a point X and a distribution P, and as such can be used for anomaly detection. Assuming that the mean of P is c and the covariance of P is $\Sigma$, the Mahalanobis distance is defined as $\sqrt{(x-c)^T\Sigma^{-1}(x-c)}=\|\phi(x)-c\|_{\Sigma^{-1}}$. In some cases, Mahalanobis distance can be used to define a new Gaussian based kernel function, but such functions may fail in high-dimensional scenarios due to the curse of dimensionality. OODDM uses the power of pre-trained model and exploits the hierarchical structure of pre-trained model with a computational efficient method as discussed in the subject disclosure, and as such suffers little or none of the failures of methods using Mahalanobis distance for OOD or anomaly detection. Further, in some embodiments, OODDM may not require or utilize outlier data or adversarial samples, unlike some methods using Mahalanobis distance for OOD or anomaly detection which may require outlier data (or adversarial samples) to calculate final anomaly score.

To obtain the results of FIG. 5 for MSP and GTMH, the evaluation procedure discussed in Hendrycks et al. is used. For ODIN, the temperature T is tuned from {1, 10, 100, 1000} and the perturbation noise parameter $\varepsilon$ from {0, 0.0005, 0.001, 0.0014, 0.002, 0.0024, 0.005, 0.01, 0.05, 0.1, 0.2}. In OODDM, the parameter $v$ from $\{10^{-5}, 10^{-3}, 10^{-1}\}$, a rotation transformation for each image x is applied, $M(x)=[M(x_0°), M(x_{90}°), M(x_{180}°), M(x_{270}°)]^T$ is calculated and Eq. 7 is solved to obtain the optimal w and R, from which the anomaly score may be determined given a data sample y (e.g., a test image). In some embodiments, the same pre-trained model obtained from Hendrycks et al. is used for all OOD detection methods shows in FIG. 5, and the figure shows the following metrics for each method: the true negative rate (TNR) at 95% true positive rate (TPR), the area under the receiver operating characteristic curve (AUROC), and the detection accuracy. The results demonstrate that under the same pre-trained model, OODDM improves upon the OOD detection ability compared to the other OOD detection methods.

FIG. 6 shows an example data table illustrating an intent classification out-of-domain query detection, according to one embodiment. In some embodiments, an intent classification dataset for task-oriented dialog systems called CLINC150 is used. CLINC150 is a crowdsourced dataset of 23,700 queries, including 22,500 in-scope queries covering 150 intents, which can be grouped into 10 general domains. The dataset also includes 1,200 out-of-scope queries, which do not fall within any of the 150 in-scope intents. In addition to the full dataset, the results in FIG. 6 also include two variations used for examining the robustness of different out-of-scope detectors, which include a first dataset labeled "Small" in FIG. 6 including only 50 training queries per each in-scope intent (e.g., rather than 100 queries for the full dataset). The other dataset used in obtaining the results in FIG. 6 is the dataset labelled "Imbal" in which intents have either 25, 50, 75, or 100 training queries. For all detection methods, the out-of-scope queries remain unseen when constructed.

In some embodiments, an intent-classifier is fine-tuned on the in-scope training dataset using bi-directional encoder representations from transformers (BERT), discussed in Devlin et al., *BERT: Pre-training of deep bidirectional transformers for language understanding, Proceedings of the* 2019 *Conference of the North American Chapter of the Association for Computational Linguistics*, pp. 4171-4186 (2019), the disclosure of which is incorporated herein by reference in its entirety. For all the OOD detection methods shown in FIG. 6, same models (i.e., open source implementation of BERT discussed in Devlin et al.) fine-tuned on the training datasets for evaluation are used. In some instances, based on BERT-base-uncased model, the models are fine-tuned on the training data for 5 epochs, with a $4 \times 10^{-5}$ learning rate, and a batch size of 128.

In some embodiments, FIG. 6 shows three baseline methods for the out-of-scope intent detection: the maximum softmax probability baseline (MSP), and the Maximum of the calibrated softmax probability with Temperature Scaling (MTS), and one-class SVM using the features from last layers (FLOC). For OODDM, the outputs from each transformer layer contained in BERT (e.g., 12 layers, and the hidden dimension is 768) are used. For MTS, the temperature T is tuned from $\{1, 5, 10, 50, 100, 500, 1000\}$ and for OODDM the parameter $\nu$ is tuned from $\{10^{-5}, 10^{-3}, 10^{-1}, 0.2\}$.

In some embodiments, the results shown in FIG. 6 demonstrate that OODDM consistently has robust performance compared to the other baseline OOD detection methods for the three variants of the CLINC 150 dataset (i.e., for the full dataset, the "small" dataset and the "imbalanced" dataset). Further, OODDM achieves significantly better performance than MTS and MSP on the imbalanced data, which indicates that OODDM can generalize well under different data shift. In some instances, OOD detection methods that incorporate features across different layers of a model or neural network may have improved performances, as indicated by the poor performance of FLOC (e.g., which incorporates features from last layers only).

FIGS. 7A-D and FIG. 8 show example plots and example data table, respectively, illustrating out-of-domain question detection for question answering systems, which is a non-classification task, according to some embodiments. In some embodiments, training a question answering (QA) model that is fine-tuned on an in-domain question answering dataset may include deciding whether the QA model should give an answer for a test input question. For example, in some cases, one may determine that a QA model may refrain from answering questions that are out-of-scope. With reference to FIGS. 7A-D and 8, the Stanford question answering dataset (SQuAD) 1.1, on which the QA model is trained, may be used as the in-domain data and HotpotQA, NewsQA, DROP, BoolQ and DuoRC may be used as out-of-distribution data. HotpotQA, NewsQA, DROP, BoolQ and DuoRC are disclosed in Z. Yang, et. al., *Generalized autoregressive pre-training for language understanding, Advances in neural information processing systems*, pp. 5754-5764 (2019); A. Trischler et al., *Newsqa: A machine comprehension dataset.* arXiv:1611.09830 (2016); D. Dua et al., *Drop: A reading comprehension benchmark requiring discrete reasoning over paragraphs.* arXiv 1903.00161 (2019); Clark et al., *Boolq: Exploring the surprising difficulty of natural yes/no questions*, arXiv:1905.10044 (2019); Saha et al., *DuoRC: Towards Complex Language Understanding with Paraphrased Reading Comprehension, Meeting of the Association for Computational Linguistics* (2018), the disclosure of each of which is incorporated by reference herein in its entirety.

In some embodiments, a heuristic baseline may be constructed by using the scores output from BERT for candidate spans, normalized by softmax function. The score of a candidate span from position i to position j is defined as $S \cdot T_i + E \cdot T_j$, where S is the starting vector and E is the ending vector introduced in BERT. $T_i$ and $T_j$ are the token embeddings output from BERT for position i and j separately. In some cases, the maximum value of the normalized scores can be used as anomaly score (MSP). In addition, the maximum calibrated probability with temperature scaling (MTS) can be used as a baseline. For OODDM, test question and passage may be treated as a single packed input sequence, and w and R may be optimized on the training dataset using the latent features of all layers from BERT.

In some embodiments, to obtain the results shown in FIGS. 7A-D and 8, the same model fine-tuned on the squad training dataset and based on BERT-base-uncased-whole-word-masking may be used for all OOD detection methods. In some cases, the model may be fine-tuned for 2 epochs, with a learning rate $3 \times 10^{-5}$, and a batch size of 3. For MTS, the temperature T is tuned from $\{1, 5, 10, 50, 100, 500, 1000\}$ and for OODDM the parameter $\nu$ is tuned from $\{10^{-5}, 10^{-3}, 10^{-1}\}$.

In some embodiments, FIGS. 7A-D show the out-of-domain evaluation results for QA systems with HotpotQA as out-of-domain samples, where FIG. 7A depicts the AUROC curve of MTS and OODDM, and FIGS. 7B-D depict anomaly score distributions of OODDM, MTS and FLOC, respectively. In some embodiments, FIG. 7D shows TNR at 95%, AUROC, and AUPR for both in and out distribution data. In some aspects, OODDM performs consistently better across all datasets, while the other three baseline anomaly criterias may not. In some cases, the MSP scores of in-distribution samples may not be necessarily higher than that of out-distribution samples. For example, HotpotQA and BoolQ may be associated with different behaviors of MSP scores: on BoolQ, MSP scores of in-distribution samples are higher, while on HotpotQA, MSP scores of out-of-distribution samples are higher.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for out-of-distribution (OOD) anomaly detection of images for an autonomous driving system, the method comprising:

implementing a neural network composed of a plurality of layers on a processor as a traffic sign classification model for the autonomous driving system;

receiving, for the neural network, a set of training images containing traffic signs and other items generated according to a preset distribution of the set of training images, wherein each layer of the plurality of layers of the neural network transforms a respective input to a respective output via a respective mapping function of a plurality of mapping functions;

training the neural network using the set of training images, to classify an incoming image depicting a traffic scene as an anomaly by determining whether the incoming image is OOD, wherein the training includes:

applying one or more geometric transformations including vertical and/or horizontal translation of a specific number of pixels to each training image of the set of the training images to create a set of transformed training images;

generating, by the plurality of layers of the neural network implemented on the processor, a feature map by combining mapping functions of the plurality of layers into a vector of mapping function elements that comprises: a first mapping function element of a first mapping function from the plurality of mapping functions, and a second mapping function element of a function composition of the first mapping function and a second mapping function from the plurality of mapping functions;

mapping, by the feature map generated by the plurality of layers of the neural network, the set of transformed training images to a set of feature space training data in a feature space; and identifying, via the processor, a hyper-ellipsoid in the feature space enclosing the set of feature space training data based on the generated feature map as a mechanism for determining whether the incoming image is OOD;

receiving, at inference time of the neural network associated with the identified hyper-ellipsoid used as the traffic sign classification model in the autonomous driving system, a first test image depicting a real world scene outside the set of training images;

applying, via the processor, one or more geometric transformations including vertical and/or horizontal translation of a specific number of pixels to the first test image to create one or more transformed test images;

using the trained neural network associated with the identified hyper-ellipsoid to determine whether the first test image is OOD, including:

mapping the one or more transformed test images into the feature space by the generated feature map;

generating, via the processor, a prediction indicating that the first test image is OOD based on whether the mapped one or more transformed test images in the feature space are outside the hyper-ellipsoid identified from the training of the neural network; and responsive to determining that the first test image is OOD, generating, by the trained neural network associated with the identified hyper-ellipsoid implemented as the traffic sign classification model in the autonomous driving system, a traffic sign classification output indicating that the first test image depicting the real world scene is an anomaly.

2. The method of claim 1, wherein the vector of mapping function elements is generated at least in part by performing a function composition of two or more mapping functions of the plurality of mapping functions to form a mapping function element in the vector.

3. The method of claim 1, wherein:

the set of training images includes a single class training dataset; and the neural network is a classifier neural model pre-trained with the single class training dataset.

4. The method of claim 1, wherein:

the set of training images includes a multi-class training dataset; and the neural network is a classifier neural model pre-trained with the multi-class training dataset.

5. The method of claim 1, wherein:

the set of training images includes an intent classification training dataset; and the neural network is a classifier neural model pre-trained with the intent classification training dataset.

6. The method of claim 1, wherein:

the set of training images includes a question answering training dataset; and the neural network is a non-classifier neural model pre-trained with the question answering training dataset.

7. The method of claim 1, wherein the neural network is a non-classifier neural model pre-trained with data lacking an OOD sample.

8. The method of claim 1, further comprising:

determining one hyper-ellipsoid that has a smallest volume among a set of candidate hyper-ellipsoids that enclose the set of feature space training data in the feature space as the hyper-ellipsoid.

9. A system for out-of-distribution (OOD) anomaly detection of images for an autonomous driving system, the system comprising:

a memory storing instructions for OOD anomaly detection of test data; and a processor configured to read and execute the instructions from the memory to:

implement a neural network composed of a plurality of layers on the processor as a traffic sign classification model for the autonomous driving system;

receive, for the neural network, a set of training images containing traffic signs and other items generated according to a preset distribution of the set of training images, wherein each layer of the plurality of layers of the neural network transforms a respective input to a respective output via a respective mapping function of a plurality of mapping functions;

train the neural network using the set of training images, to classify an incoming image depicting a traffic scene as an anomaly by determining whether the incoming image is OOD, wherein the training includes:

applying one or more geometric transformations including vertical and/or horizontal translation of a specific number of pixels to each training image of the set of the training images to create a set of transformed training images;

generating, by the plurality of layers of the neural network implemented on the processor, a feature map by combining mapping functions of the plurality of layers into a vector of mapping function elements that comprises: a first mapping function element of a first mapping function from the plurality of mapping functions, and a second mapping function element of a function composition of the first mapping function and a second mapping function from the plurality of mapping functions;

mapping, by the feature map generated by the plurality of layers of the neural network, the set of transformed training images to a set of feature space training data in a feature space; and identifying, via the processor, a hyper-ellipsoid in the feature space enclosing the set of feature space training data based on the generated feature map as a mechanism for determining whether the incoming image is OOD;

receive, at inference time of the neural network associated with the identified hyper-ellipsoid used as the traffic sign classification model in the autonomous driving system, a first test image depicting a real world scene outside the set of training images;

apply, via the processor, one or more geometric transformations including vertical and/or horizontal translation of a specific number of pixels to the first test image to create one or more transformed test images;

use the trained neural network associated with the identified hyper-ellipsoid to determine whether the first test image is OOD, including:

mapping the one or more transformed test images into the feature space by the generated feature map;

generating, via the processor, a prediction indicating that the first test image is OOD based on whether the mapped one or more transformed test images in the feature space are outside the hyper-ellipsoid identified from the training of the neural network; and responsive to determining that the first test image is OOD, generate, by the trained neural network associated with the identified hyper-ellipsoid implemented as the traffic sign classification model in the autonomous driving system, a traffic sign classification output indicating that the first test image depicting the real world scene is an anomaly.

10. The system of claim 9, wherein:

the vector of mapping function elements is generated at least in part by performing a function composition of two or more mapping functions of the plurality of mapping functions to form a mapping function element in the vector.

11. The system of claim 9, wherein:

the set of training images includes a single class training dataset, a multi-class training dataset or an intent classification training dataset; and

the neural network is a classifier neural model pre-trained with the single class training dataset, the multi-class training dataset or the intent classification training dataset.

12. The system of claim 9, wherein:

the set of training images includes a question answering training dataset; and the neural network is a non-classifier neural model pre-trained with the question answering training dataset.

13. The system of claim 9, wherein the neural network is a non-classifier neural model pre-trained with data lacking an OOD sample.

14. The system of claim 9, further the processor is further configured to:

determine one hyper-ellipsoid that has a smallest volume among a set of candidate hyper-ellipsoids that enclose the set of feature space training data in the feature space as the hyper-ellipsoid.

15. A non-transitory computer-readable medium (CRM) having stored thereon machine-readable instructions for out-of-distribution (OOD) anomaly detection of images for an autonomous driving system, the machine-readable instructions executable to cause a processor to perform operations comprising:

implementing a neural network composed of a plurality of layers on the processor as a traffic sign classification model for the autonomous driving system;

receiving, for the neural network, a set of training images containing traffic signs and other items generated according to a preset distribution of the set of training images, wherein each layer of the plurality of layers of the neural network transforms a respective input to a respective output via a respective mapping function of a plurality of mapping functions;

training the neural network using the set of training images, to classify an incoming image depicting a traffic scene as an anomaly by determining whether the incoming image is OOD, wherein the training includes:

applying one or more geometric transformations including vertical and/or horizontal translation of a specific number of pixels to each training image of the set of the training images to create a set of transformed training images;

generating, by the plurality of layers of the neural network implemented on the processor, a feature map by combining mapping functions of the plurality of layers into a vector of mapping function elements that comprises: a first mapping function element of a first mapping function from the plurality of mapping functions, and a second mapping function element of a function composition of the first mapping function and a second mapping function from the plurality of mapping functions;

mapping, by the feature map generated by the plurality of layers of the neural network, the set of transformed training images to a set of feature space training data in a feature space; and identifying, via the processor, a hyper-ellipsoid in the feature space enclosing the set of feature space training data based on the generated feature map as a mechanism for determining whether the incoming image is OOD;

receiving, at inference time of the neural network associated with the identified hyper-ellipsoid used as the traffic sign classification model in the autonomous driving system, a first test image depicting a real world scene outside the set of training images;

applying, via the processor, one or more geometric transformations including vertical and/or horizontal translation of a specific number of pixels to the first test image to create one or more transformed test images;

using the trained neural network associated with the identified hyper-ellipsoid to determine whether the first test image is OOD, including:

mapping the one or more transformed test images into the feature space by the generated feature map;

generating, via the processor, a prediction indicating that the first test image is OOD based on whether the mapped one or more transformed test images in the feature space are outside the hyper-ellipsoid identified from the training of the neural network; and responsive to determining that the first test image is OOD, generating, by the trained neural network associated with the identified hyper-ellipsoid implemented as the traffic sign classification model in the autonomous driving system, a traffic sign classification output indicating that the first test image depicting the real world scene is an anomaly.

16. The non-transitory CRM of claim 15, wherein:

the vector of mapping function elements is generated at least in part by performing a function composition of two or more mapping functions of the plurality of mapping functions to form a mapping function element in the vector.

17. The non-transitory CRM of claim 15, wherein:

the set of training images includes a single class training dataset, a multi-class training dataset or an intent classification training dataset; and the neural network is a classifier neural model pre-trained with the single class training dataset, the multi-class training dataset or the intent classification training dataset.

18. The non-transitory CRM of claim 15, wherein:

the set of training images includes a question answering training dataset; and the neural network is a non-classifier neural model pre-trained with the question answering training dataset.

19. The non-transitory CRM of claim 15, wherein the neural network is a non-classifier neural model pre-trained with data lacking an OOD sample.

20. The non-transitory CRM of claim 15, wherein the operations further comprise determining one hyper-ellipsoid that has a smallest volume among a set of candidate hyper-ellipsoids that enclose the set of feature space training data in the feature space as the hyper-ellipsoid.

* * * * *